Dec. 2, 1947.  G. A. LYON  2,431,700
ORNAMENTAL TRIM RING FOR VEHICLE WHEELS
Filed April 1, 1946

Inventor
GEORGE ALBERT LYON
by The Firm of Charles W. Hills
Attys.

Patented Dec. 2, 1947

2,431,700

UNITED STATES PATENT OFFICE 2,431,700

ORNAMENTAL TRIM RING FOR VEHICLE WHEELS

George Albert Lyon, Allenhurst, N. J.

Application April 1, 1946, Serial No. 658,710

6 Claims. (Cl. 301—37)

1

This invention relates to a wheel cover structure and more particularly to a novel retaining means for holding an annular wheel cover on a wheel.

An object of this invention is to provide retaining means for a wheel trim or cover, which can cooperate with the usual wheel openings and which can force a margin of the cover tightly against one of the wheel parts.

Still another object of this invention is to provide a composite plastic and metal wheel cover assembly wherein the metal part rigidifies and reinforces the plastic part and serves to retain the same on the wheel.

In accordance with the general features of this invention, there is provided in a cover structure for a wheel, including multi-flanged tire rim and load bearing parts separated at spaced intervals to provide wheel openings, a circular plastic wheel cover for one of the parts having a margin provided with a plurality of spaced axially rearwardly projecting tabs positioned to extend into said openings, and an annular metal retaining ring engaging said cover margin and carrying spring clips projecting into and wedged in said openings to force said ring against said cover margin and to thus retain the cover on the wheel.

Other objects and features of this invention will more fully appear from the following detailed description taken in connection with the accompanying drawings which illustrate a single embodiment thereof and in which Figure 1 is a side view of a wheel structure embodying the features of this invention and wherein the cover assembly is partly broken away to show one of the openings in the body of the wheel;

Figure 2:
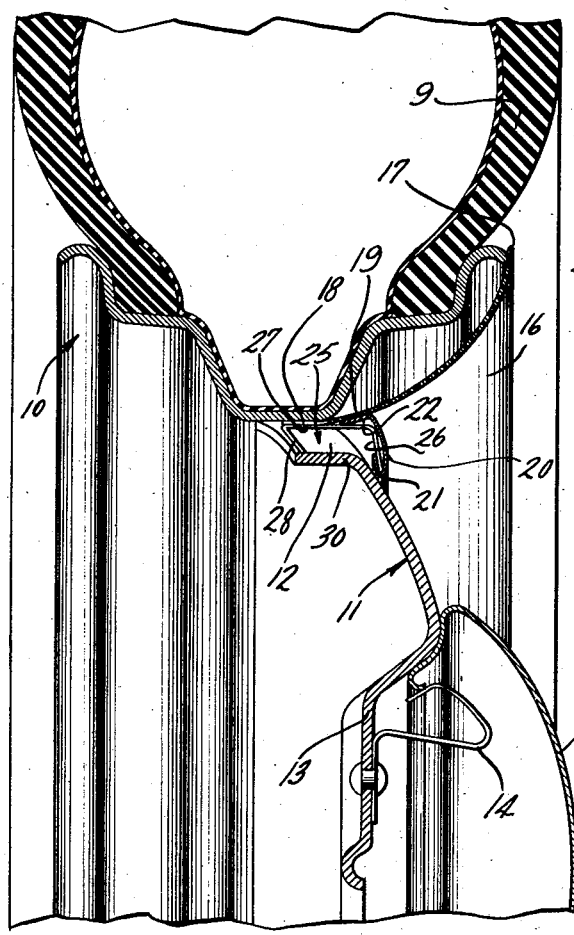
Figure 2 is an enlarged fragmentary cross sectional view taken on substantially the line II—II of Figure 1 looking in the direction indicated by the arrows.
Figure 1:
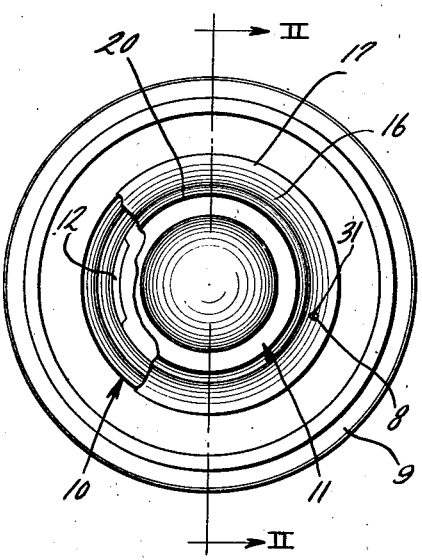
Figure 3:
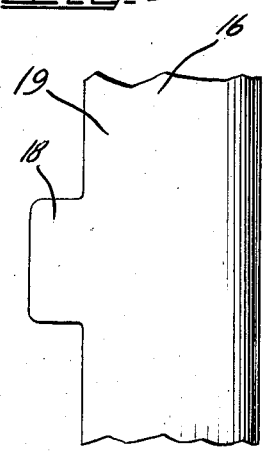
Figure 3 is a fragmentary detailed view showing a portion of an inner margin of the outer plastic cover and illustrating one of the tabs thereon.
Figure 4:
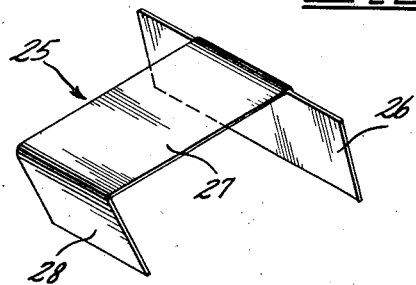
Figure 4 is an isometric view of one of the spring clips cooperating with the retaining ring in the retention of the plastic cover on the wheel.

The reference character 9 designates generally a conventional pneumatic tire and tube assembly mounted in the usual way upon a mlti-flanged drop center tire rim 10, which is now well known in the wheel art.

This tire rim comprises one part of the wheel

2 and is supported by a load bearing or body part 11 which, as is well known in the art, is usually made from a metallic stamping.

The body part 11 includes at its outer margin spaced axially extending wheel openings 12, which permit of the circulation of air through the wheel. Portions of the body part 11 between the circumferentially spaced openings 12 are attached by any suitable means to the base flange of the tire rim 10, as is also well known in the art.

The bulged body part 11 is centrally dished at 13 so as to provide a bolt-on flange by means of which the wheel can be attached by cap screws or bolts (not shown) in the usual manner to a part on an axle of a wheel. The central flange 13 of the body part carries a plurality of inverted spring clips 14 which detachably retain on the body part a metallic hub cap 15. As is well known, removal of the hub cap 15 enables access to the wheel bolts (not shown) for the purpose of detaching the bolts or cap screws, as the case might be, from the wheel.

My invention is particularly concerned with the provision of an annular cover or wheel trim for the exposed outer side flanges of the rim part 10. Such a cover is designated generally by the reference character 16 and may be made of any suitable sheet material, although it is contemplated that excellent results may be obtained by manufacturing it from a synthetic plastic material, such as ethyl cellulose, cellulose acetate and vinyl resins.

The outer periphery of the annular cover 16 is provided with an edge 17 adapted to bear against an outer edge of the rim part 10. From this outer edge 17 the cover 16 is convexly curved axially and radially inwardly to an inner marginal portion 19 having circumferentially spaced tabs 18 corresponding in number to the number of the wheel openings 12. As is well known in the art, the wheel openings 12 may comprise three to five, as desired, although in the illustrated embodiment I have shown only three wheel openings.

The tabs 18 are positioned to project axially rearwardly into the wheel openings and to thus hold the cover in centered relation to the wheel.

Now in order to retain the cover or trim 16 on the wheel, there is provided an annular metallic ring 20 which may be made of any suitable steel sheet, although I find it preferable to make it of 18.8 or stainless steel. This ring 20 is located opposite the wheel openings 12 and has a turned radially inner margin 21. The outer margin of the ring 20 is likewise turned axially rearwardly at 22 for engagement with the inner margin 19 of the plastic ring 16.

This retaining ring 20 carries a plurality of spaced spring clips 25 corresponding in number to the number of wheel openings 12. Each of these clips 25 includes a lateral outer flange 26 seated behind the turned inner margin 21 of the ring 20 so as to be firmly held in position by the ring. In addition, each clip includes an axially rearwardly projecting portion 27 extending into the wheel opening and terminating in an inclined finger 28 adapted to wedgingly engage a turned margin 30 of the body part defining a radially inner side of the wheel opening 12. In this manner the clips can be wedgingly retained in a wheel opening.

In the application of the cover 16, the wheel is first aligned with the tire rim part 10 and then its tabs 18 are projected into the wheel openings 12. Thereafter, the retaining ring 20 with the fingers 28 carried thereby is positioned over the radially inner margin 19 of the cover 16 and the clips 25 are located opposite the wheel openings 12. Then by pressing the ring 20 axially rearwardly it is possible to move the fingers 28 of the clips into the wheel openings 12 and at the same time bring the outer margin 22 of the ring into tensioned engagement with the inner margin 19 of the cover ring 16. This results in the tabs 18 on the iner margin of the plastic ring being deflected into tight engagement with the base of the tire rim part 10. It also results in the clips being wedged in the wheel openings so that both the cover 16 and the ring 20 are held in assembled relation on the wheel.

In addition, due to the angularity of each of the fingers 28, any tendency to remove the clips from the outer side of the wheel results in an enhancement of the biting engagement of the fingers against the turned portion 30 of the body part 11.

The clips, however, can be each easily released from their wedged cooperation with the body part by inserting a suitable tool or screw driver from the rear side of the wheel in an opening 12 and by pressing the finger 28 axially outwardly out of engagement with the body portion 30.

The radial depth and configuration of the plastic ring 16 is such that in use it affords an illusion of being a part of the side wall of the tire. This illusion may be accentuated if the ring 16 has a white external finish, in which event, it appears to constitute a white side wall part of the tire.

Moreover, it should be noted that the ring 20 if given a highy lustrous finish will present a pleasing appearance when contrasted against the solid color of the ring 16.

I claim as my invention:

1. In a cover structure for a wheel, including multi-flanged tire rim and load bearing parts separated at spaced intervals to provide wheel openings, a circular wheel cover for one of said parts having a margin provided with a tab projecting into a wheel opening and an annular ring engaging said cover margin and carrying spring clip means projecting into and retainingly wedged in the wheel opening to force said ring against said cover margin and retain said cover on the wheel.

2. In a cover structure for a wheel, including multi-flanged tire rim and load bearing parts separated at spaced intervals to provide wheel openings, a circular wheel cover for one of said parts having a margin provided with a tab projecting into a wheel opening and an annular ring engaging said cover margin and carrying spring clip means projecting into and retainingly wedged in the wheel opening to force said ring against said cover margin and retain said cover on the wheel, said clip means including an inclined finger deflectable from the rear side of the wheel out of said wedged engagement.

3. In a cover structure for a wheel, including multi-flanged tire rim and load bearing parts separated at spaced intervals to provide wheel openings, a circular wheel cover for one of said parts having a margin provided with means projecting into said wheel openings and an annular ring engaging said cover margin and carrying spring clip means projecting into and retainingly wedged in the wheel opening to force said ring against said cover margin and retain said cover on the wheel, said annular ring having a radially inner turned margin and said clip means including a leg seated behind said margin of said ring and thus being secured to the ring and also including an axially rearwardly projecting portion for disposition in the wheel opening and terminating in an inclined finger for wedged retaining engagement with one of said wheel parts in said openings.

4. In a cover structure for a wheel, including multi-flanged tire rim and load bearing parts separated at spaced intervals to provide wheel openings, a circular wheel cover for one of said parts having a margin provided with a tab projecting into a wheel opening and an annular ring engaging said cover margin and carrying spring clip means projecting into and retainingly wedged in the wheel opening to force said ring against said cover margin and retain said cover on the wheel, said wheel cover comprising an annulus with an outer annular portion formed to bear against an edge of the rim part and being curved axially and radially rearwardly to said margin containing said tab.

5. In a cover structure for a wheel including multi-flanged tire rim and load bearing parts separated at spaced intervals to provide wheel openings, and a circular wheel cover for one of said parts, having a radially inner margin provided with a plurality of axially projecting tabs positioned to extend into said wheel openings and an annular retaining ring engaging said radially inner cover margin and carrying spring clip means projecting into and wedged in said wheel openings to force said ring against said cover margin and to thus retain said cover on the wheel.

6. In a cover structure for a wheel including multi-flanged tire rim and load bearing parts separated at spaced intervals to provide wheel openings, and a circular wheel cover for one of said parts, having a radially inner margin provided with a plurality of axially projecting tabs positioned to extend into said wheel openings and an annular retaining ring engaging said radially inner cover margin and carrying spring clip means projecting into and wedged in said wheel openings to force said ring against said cover margin and to thus retain said cover on the wheel, said wheel cover comprising an annulus made of synthetic plastic sheet with its radially inner margin flexible into tight contact against the tire rim part by the pressure of said annular retaining ring.

GEORGE ALBERT LYON.